(12) United States Patent
Kaizu et al.

(10) Patent No.: US 7,880,997 B2
(45) Date of Patent: Feb. 1, 2011

(54) MAGNETIC RECORDING APPARATUS AND MAGNETIC RECORDING MEDIUM

(75) Inventors: Akimasa Kaizu, Tokyo (JP); Satoshi Tomikawa, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 154 days.

(21) Appl. No.: 12/379,763

(22) Filed: Feb. 27, 2009

(65) Prior Publication Data

US 2009/0231746 A1    Sep. 17, 2009

(30) Foreign Application Priority Data

Mar. 17, 2008    (JP) ............... 2008-068514

(51) Int. Cl.
    *G11B 5/02*    (2006.01)
(52) U.S. Cl. .................. 360/59; 360/60; 360/62; 360/75; 360/125.09
(58) Field of Classification Search .............. None
    See application file for complete search history.

(56) References Cited

U.S. PATENT DOCUMENTS

| | | | |
|---|---|---|---|
| 5,858,474 A * | 1/1999 | Meyer et al. ............. 427/555 |
| 6,027,825 A * | 2/2000 | Shiratori et al. .......... 428/819 |
| 6,333,900 B1 * | 12/2001 | Maro et al. ............. 369/13.17 |
| 6,483,784 B1 * | 11/2002 | Nakatani et al. ......... 369/13.38 |
| 6,747,841 B1 * | 6/2004 | Olim et al. ............. 360/125.39 |
| 7,215,502 B2 * | 5/2007 | Tagami ................. 360/77.08 |
| 7,251,101 B2 | 7/2007 | Soeno |
| 7,352,529 B2 * | 4/2008 | Hibi et al. ............... 360/135 |
| 7,423,842 B2 * | 9/2008 | Fujita et al. ............. 360/135 |
| 7,480,924 B2 * | 1/2009 | Hattori et al. ............ 720/659 |
| 7,518,826 B2 * | 4/2009 | Matono et al. ......... 360/125.02 |
| 7,670,696 B2 * | 3/2010 | Fullerton et al. .......... 428/834 |
| 2005/0193405 A1 | 9/2005 | Hattori et al. |
| 2006/0221482 A1 * | 10/2006 | Matsumoto et al. ......... 360/59 |

FOREIGN PATENT DOCUMENTS

| | | |
|---|---|---|
| JP | A-2004-234819 | 8/2004 |
| JP | A-2004-355739 | 12/2004 |
| JP | A-2005-243186 | 9/2005 |
| JP | A-2007-073116 | 3/2007 |
| JP | A-2008-034004 | 2/2008 |

* cited by examiner

*Primary Examiner*—Dismery E Mercedes
(74) *Attorney, Agent, or Firm*—Oliff & Berridge, PLC

(57) ABSTRACT

In the magnetic recording apparatus, a recording layer is formed in a concavo-convex pattern, and recording elements are formed of convex portions of the concavo-convex pattern. Furthermore, the following equation (I)

$$B_L \leq E_{RL} \leq B_L + 2 \times G_L$$    (Equation (I))

is satisfied in each of tracks, where $B_L$ represents a length of the recording element in a circumferential direction, $G_L$ represents a length of a gap between the recording elements in the circumferential direction, and $E_{RL}$ represents an effective recording length which is a length of an effective recording area $E_R$ in the circumferential direction, the effective recording area $E_R$ being created on a magnetic recording medium by a heating head and a recording head.

15 Claims, 12 Drawing Sheets

Position in circumferential direction on magnetic recording medium

Position in track width direction on magnetic recording medium

Position in circumferential direction on magnetic recording medium

Position in track width direction on magnetic recording medium

MAGNETIC RECORDING APPARATUS AND MAGNETIC RECORDING MEDIUM

BACKGROUND OF THE INVENTION

1. Field of the Invention

The present invention relates to a magnetic recording medium and a magnetic recording apparatus for recording magnetic data on the magnetic recording medium by applying a magnetic field and by heating.

2. Description of the Related Art

Conventionally, magnetic recording apparatus such as hard disks have been significantly improved in areal density, for example, by employing finer magnetic grains or alternative materials for the recording layer of magnetic recording media and advanced microprocessing for recording and reproducing heads. Further improvement in areal density is still being expected.

However, these conventional approaches to the improvement of areal density have already reached their limits due to several problems that have come to the surface. For example, the circumferential length of a recording bit may be reduced in order to increase the recording density in the circumferential direction of the track. Yet, this causes relatively great thermal fluctuations in the magnetic grains that constitute the recording layer, thereby making it difficult to sustain the recorded signals with stability.

In this context, there has been suggested a patterned medium as a candidate magnetic recording medium capable of providing further improved areal density. This patterned medium has a recording layer formed in a concavo-convex pattern in a data area and recording elements for recording magnetic data are formed of convex portions of the concavo-convex pattern. Furthermore, in each of tracks, the convex recording elements are separated from each other in a circumferential direction and arranged in a row in the circumferential direction.

Also suggested is using, as a material for the recording layer, one that has higher magnetic anisotropic energy and higher coercivity. For example, as a material for the recording layer, it is suggested to use a material having a coercivity as high as 4 kOe or greater.

However, in general, the recording magnetic field used for saturation magnetic recording is said to need a strength of about twice the coercivity. In some cases, use of the aforementioned material having high magnetic anisotropic energy and high coercivity for the recording layer would make it difficult for the conventional magnetic head to magnetically saturate the recording layer. That is, magnetic data could be recorded or erased with difficulty.

In contrast to this, a heat-assisted magnetic recording apparatus has also been suggested. This apparatus is designed to heat a portion of the recording layer by irradiating it with a beam of light and thus temporarily reduce coercivity of the portion. Then, a recording magnetic field is applied to this portion for recording magnetic data.

The heat-assisted magnetic recording apparatus employing the patterned medium will likely provide further improvement in areal density (for example, see Japanese Patent Application Laid-Open No. 2004-355739, No. 2007-73116, and No. 2008-34004).

However, in the recording layer, not only the portion irradiated with the beam of light but also its surrounding portions are heated by heat transfer. Also, the temperature distribution of the heated portion and magnetic field distribution of the magnetic head are not uniform. Furthermore, the magnetic recording medium rotates at high speed relative to the recording head and the heating head.

Thus, it was difficult to create a region where recording magnetic field is greater than the coercivity of the recording layer thereby magnetic data can be recorded or erased only at a target recording element of the magnetic recording medium in the same shape as that of the target recording element by use of the magnetic head and the heating head. Accordingly, in some cases, it was impossible to reliably record magnetic data on the target recording element entirely from one end to the other end. In particular, since the magnetic recording medium rotates at high speed relative to the magnetic head and the heating head, it was difficult to reliably record magnetic data on the target recording element from one end to the other end in the circumferential direction. Note that the region in which magnetic data is recordable and erasable may be created by the recording head and the heating head in a shape sufficiently greater than that of the target recording element on the magnetic recording medium. This may assure it to record the magnetic data on the target recording element from one end to the other end in the circumferential direction. However, in this case, it is likely that the magnetic data may also be accidentally recorded not only on the target recording element but also on other recording elements adjacent to the target recording element.

SUMMARY OF THE INVENTION

In view of the foregoing problems, various exemplary embodiments of this invention provide a magnetic recording apparatus which can reliably record magnetic data on the target recording element from one end to the other end in the circumferential direction and prevent the magnetic data from being erroneously recorded on other recording elements adjacent to the target recording element. Various exemplary embodiments of this invention also provide a magnetic recording medium which is incorporated into such a magnetic recording apparatus.

Various exemplary embodiments of the present invention allow for reliably recording magnetic data on a target recording element from one end to the other end in the circumferential direction and preventing the magnetic data from being erroneously recorded on other recording elements adjacent to the target recording element. To this end, the recording layer is formed in a concavo-convex pattern, and the recording elements are formed of convex portions of the concavo-convex pattern. Furthermore, the following equation (I)

$$B_L \leq E_{RL} \leq B_L + 2 \times G_L \tag{Equation (I)}$$

is satisfied in each track, where $B_L$ represents a length of the recording element in a circumferential direction, $G_L$ represents a length of a gap between the recording elements in each track in the circumferential direction, and $E_{RL}$ represents an effective recording length which is a length of an effective recording area in the circumferential direction, the effective recording area being created on the magnetic recording medium by the heating head and the recording head.

Accordingly, various exemplary embodiments of this invention provide a magnetic recording apparatus comprising: a magnetic recording medium in which a recording layer is formed in a concavo-convex pattern so that recording elements for recording magnetic data are formed of convex portions of the concavo-convex pattern and a plurality of the recording elements is arranged in each of tracks in a row in a circumferential direction; a heating head for heating the recording element; and a recording head for applying a recording magnetic field to the recording element, wherein the following equation (I)

$$B_L \leq E_{RL} \leq B_L + 2 \times G_L \quad \text{(Equation (I))}$$

is satisfied in each of the tracks, where $B_L$ represents a length of the recording element in the circumferential direction, $G_L$ represents a length of a gap between the recording elements in the circumferential direction, and $E_{RL}$ represents an effective recording length which is a length of an effective recording area in the circumferential direction, the effective recording area being created on the magnetic recording medium by the heating head and the recording head.

Moreover, various exemplary embodiments of this invention provide the magnetic recording medium incorporated into the magnetic recording apparatus.

In the description of the present application, the term "magnetic recording medium in which a recording layer formed in a concavo-convex pattern so that recording elements for recording magnetic data are formed of convex portions of the concavo-convex pattern and a plurality of the recording elements is arranged in each of tracks in a row in a circumferential direction." is used to include one having a recording layer divided into a large number of recording elements in a predetermined pattern. In addition to this type of medium, this "magnetic recording medium" is used to include: a magnetic recording medium having a recording layer in which concave portions are formed from an upper surface facing against the substrate to a position between the upper surface and a lower surface facing to the substrate and the lower surface is continuous; a magnetic recording medium having a continuous recording layer formed following the surface of the substrate or the underlying layer formed in a concavo-convex pattern; and a magnetic recording medium having a recording layer divided and formed on the top surface of convex portions and the bottom surface of concave portions of a substrate or an underlying layer formed in a concavo-convex pattern, and the portions formed on the top surface of the convex portions of the substrate or the underlying layer form recording elements.

In the description of the present application, the term "magnetic recording medium" is used to include hard disks as well as other magnetic recording media such as FLOPPY (Registered Trade Mark) discs.

In the description of the present application, the term "the length $B_L$ of the recording element in the circumferential direction" is used to refer to the length at the level of the surface of the recording element (the surface facing the recording head). The same holds true for "the length of a gap $G_L$ between the recording elements in the circumferential direction", "the effective recording length $E_{RL}$ of an effective recording area," "the width $B_W$ of the recording element in the track width direction", "the width $G_W$ of a gap between the tracks in the track width direction", and "the effective recording width $E_{RW}$ of the effective recording area".

In the description of the present application, the term "effective recording area" is used to refer to a region which is created on the magnetic recording medium by the heating head and the recording head, assuming that the recording layer is uniformly formed of continuous film across the entire surface of the magnetic recording medium. In this region, the recording magnetic field is greater than the coercivity of the recording layer, and magnetic data is recordable and erasable. Note that the heating duration for the heating head used to record magnetic data on the target recording element as well as the duration of application of the recording magnetic field of the recording head can be adjusted. This makes it possible to increase or decrease the effective recording length $E_{RL}$ of the effective recording area. Additionally, the heating duration of the heating head can also be adjusted, thereby allowing for increasing or decreasing the effective recording width $E_{RW}$ of the effective recording area.

In the description of the present application, the term "recording deviation in the circumferential direction" is used to refer to the upper limit of the amount of circumferential deviation between the center of the effective recording area in the circumferential direction and the center of the target recording element in the circumferential direction.

In the description of the present application, the term "recording deviation in the track width direction" is used to refer to the upper limit of the amount of deviation in the track width direction between the center of the effective recording area in the track width direction and the center of the target recording element in the track width direction.

DETAILED DESCRIPTION OF THE PREFERRED EMBODIMENTS

Figure 1:
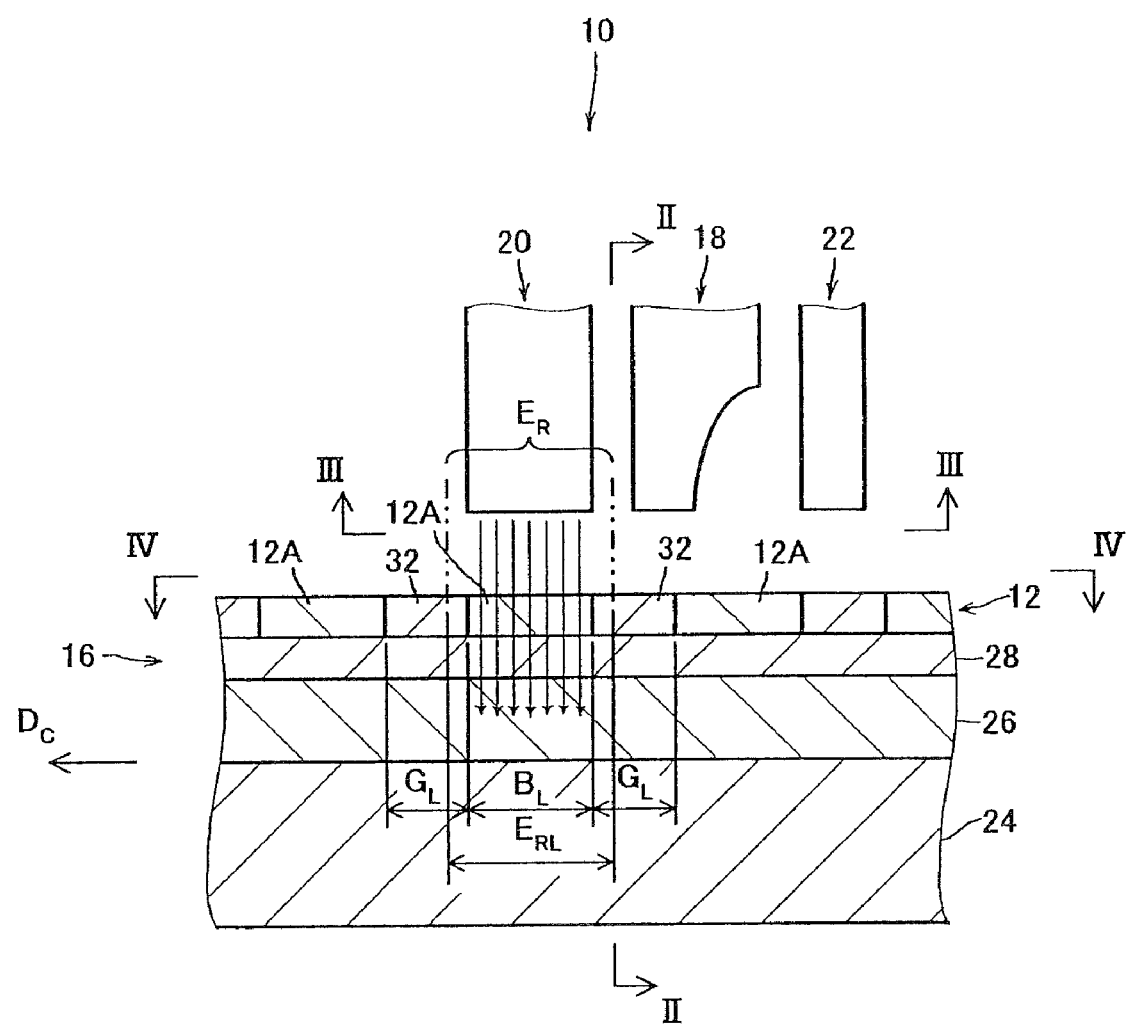
FIG. 1 is a cross-sectional side view, along a circumferential direction of a magnetic recording medium, schematically illustrating the general structure of a magnetic recording apparatus according to a first exemplary embodiment of the present invention.

Hereinafter, preferred exemplary embodiments of the present invention will be described in detail with reference to the drawings.

As shown in FIGS. 1 to 6, a magnetic recording apparatus 10 according to a first exemplary embodiment of the present invention includes: a magnetic recording medium 16 in which a recording layer 12 is formed in a concavo-convex pattern so that a recording elements 12A for recording magnetic data are formed of convex portions of the concavo-convex pattern, and a plurality of the recording element 12A is arranged in each of tracks 14 in a row in the circumferential direction; a heating head 18 for heating the recording element 12A; a recording head 20 for applying a recording magnetic field to the recording element 12A; and a reproducing head 22 for sensing a reproducing magnetic field of the recording element 12A. The magnetic recording apparatus 10 is characterized in that the following equation (I)

$$B_L \leq E_{RL} \leq B_L + 2 \times G_L \qquad \text{Equation (I)}$$

is satisfied in each of the tracks 14, where $B_L$ represents the length of the recording element 12A in a circumferential direction $D_C$, $G_L$ represents the length of a gap between the recording elements 12A in the circumferential direction $D_C$, and $E_{RL}$ represents the effective recording length which is a length of an effective recording area $E_R$ in the circumferential direction $D_C$, the effective recording area $E_R$ being created on the magnetic recording medium 16 by the heating head 18 and the recording head 20.

The magnetic recording medium 16 is a perpendicular recording type patterned medium having a generally disk-shaped body and driven by a motor (not shown) along an arrow in the circumferential direction $D_C$ as shown in FIGS. 1 and 3 to 6.

The magnetic recording medium 16 has a substrate 24, a soft magnetic layer 26, a seed layer 28, and the recording layer 12, with these layers formed in that order over the substrate 24. Additionally, the concave portion between the recording elements 12A is filled with a filler 32 having a thermal conductivity lower than that of the recording element 12A. Note that in practice, a protective layer and a lubricant layer are formed in that order over the recording element 12A and the filler 32. However, the protective layer and the lubricant layer do not seem necessary in understanding this first exemplary embodiment and will not be illustrated and explained.

The recording layer 12 has a thickness of 5 to 30 nm. The recording layer 12 is made of a material having a perpendicular magnetic anisotropic energy of, for example, $1 \times 10^6$ erg/cc or greater. To be more specific, the recording layer 12 can be formed, for example, of a CoCr-based alloy such as a CoCrPt alloy, a CoPt-based alloy, an FePt-based alloy, a stacked structure of those layers, a Co/Pd multi-layered film, or a Co/Pt multi-layered film.

Figure 2:
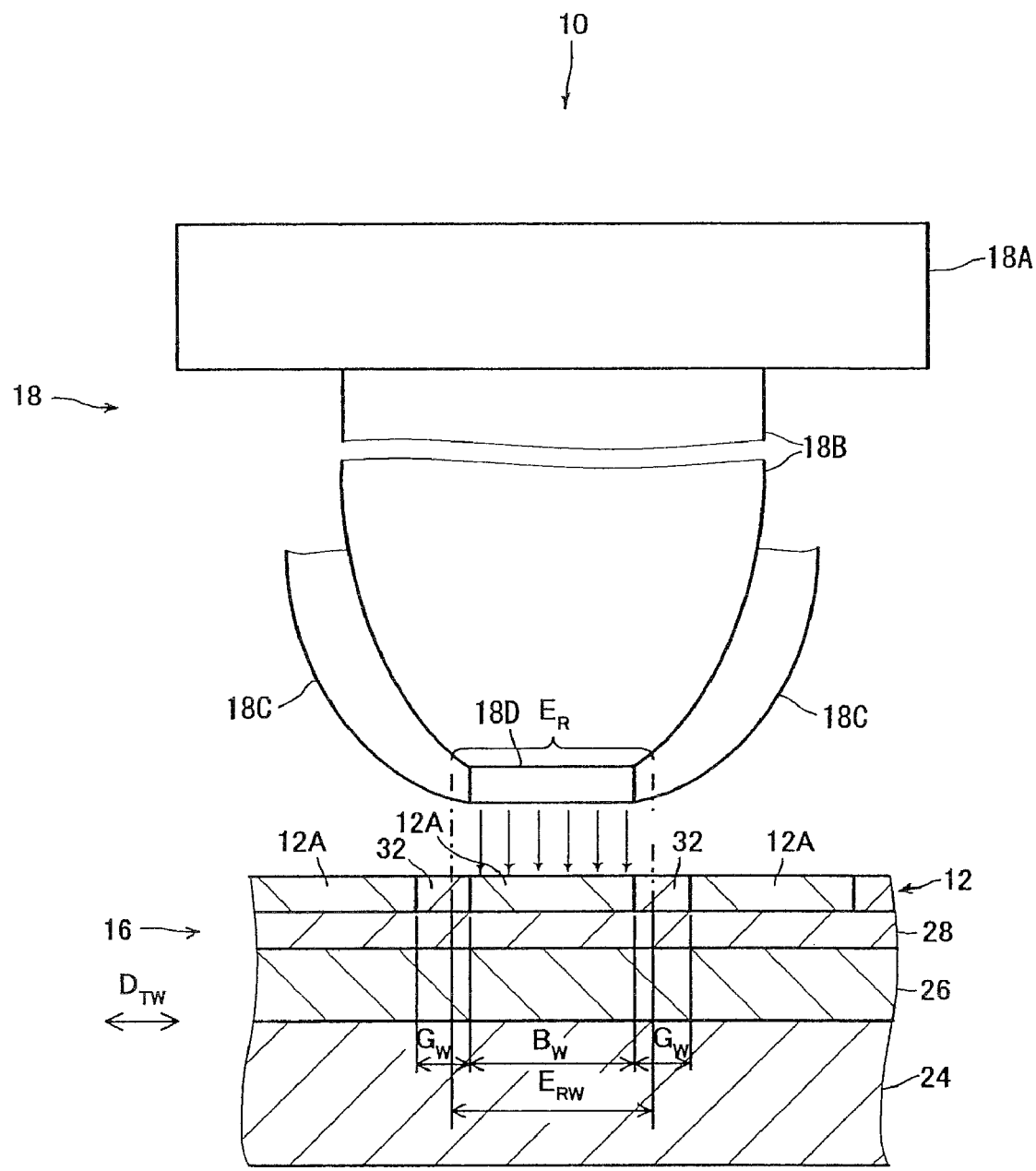
FIG. 2 is a cross-sectional side view taken along line II-II of FIG. 1 or in a track width direction of the magnetic recording medium.
Figure 4:
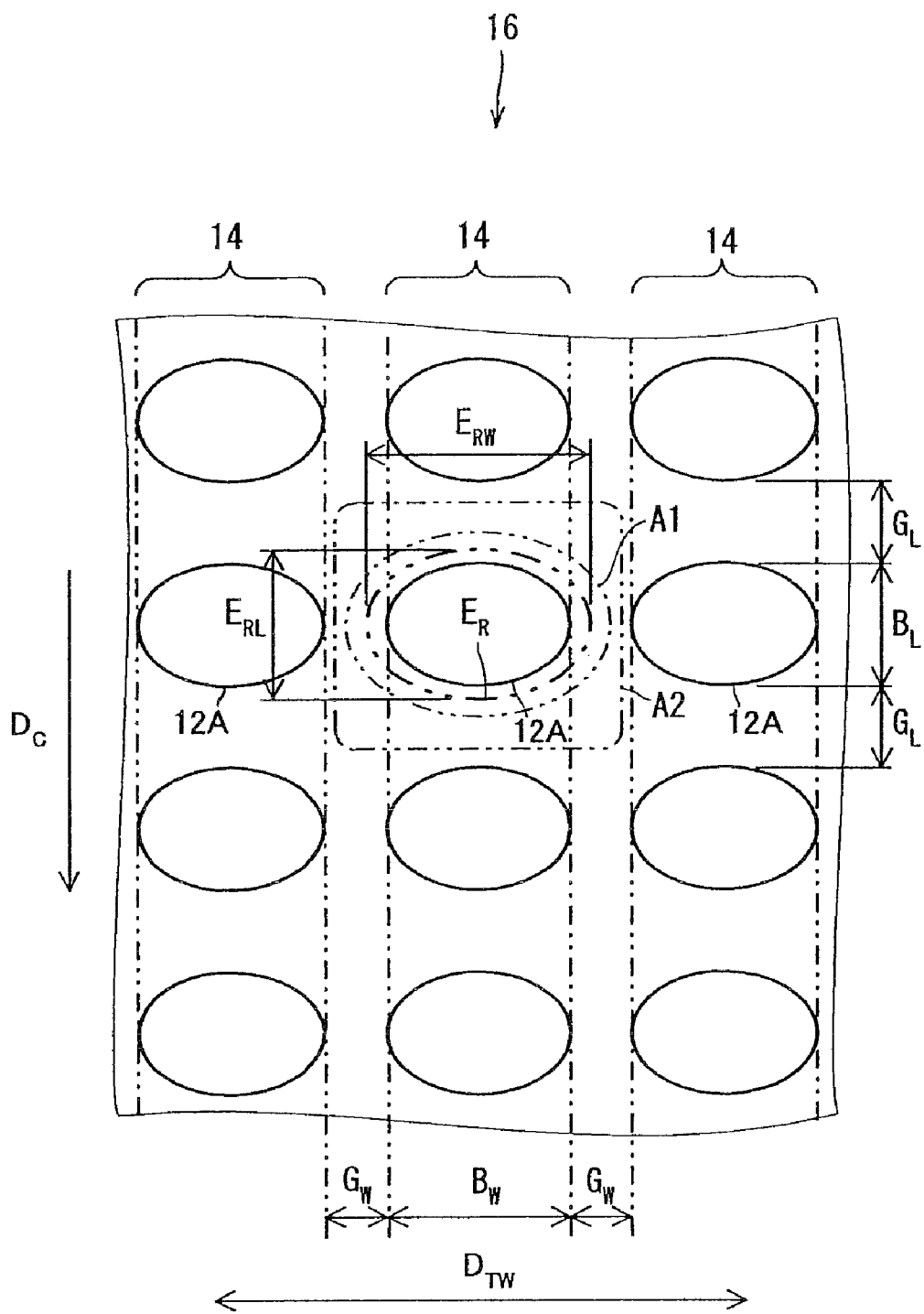
FIG. 4 is a plan view, taken along line IV-IV of FIG. 1, illustrating the magnetic recording medium when viewed from the recording head.
Figure 6:
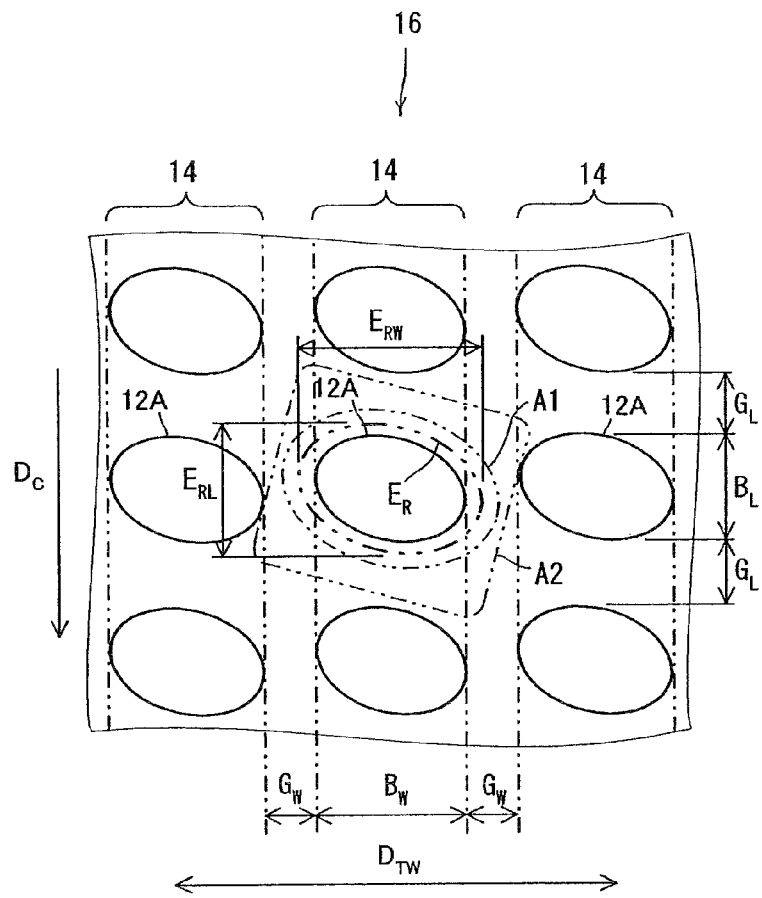
FIG. 6 is a plan view illustrating the magnetic recording medium at a radial position different from that of FIG. 4.

As shown in FIGS. 1, 2, 4 and 6, the recording elements 12A or the convex portions of the recording layer 12 in a data area are divided on each track 14 at microscopic intervals in the circumferential direction $D_C$. More specifically, in the data area, each of the recording elements 12A is formed in a shape equivalent to one recording bit (one recording bit is recorded on one recording element 12A). Note that as shown in FIGS. 2, 4, and 6, the recording elements 12A in the data area are also divided at microscopic intervals in the track width direction $D_{TW}$. On the other hand, in a servo area, the recording layer 12 is formed in a shape corresponding to a predetermined servo information pattern or the like (not shown).

In this first exemplary embodiment, each of the recording elements 12A has a generally elliptic shape in a plan view when viewed in a thickness direction of the magnetic recording medium 16. Preferably, the recording element 12A is elliptic so that its length $B_L$ in the circumferential direction $D_C$ is shorter than its width $B_W$ in the track width direction $D_{TW}$. This makes it possible to increase the recording density in the circumferential direction $D_C$.

In this first exemplary embodiment, the shape of the recording element 12A is generally constant irrespective of the radial position of the track 14 on which the recording element 12A is located. Additionally, in this first exemplary embodiment, the pitch of the recording element 12A in the circumferential direction $D_C$ is also generally constant irrespective of the radial position of the track 14 on which the recording element 12A is located. Furthermore, in this first exemplary embodiment, the pitch of the track 14 in the track width direction $D_{TW}$ is also generally constant irrespective of the radial position of the track 14.

Figure 5:
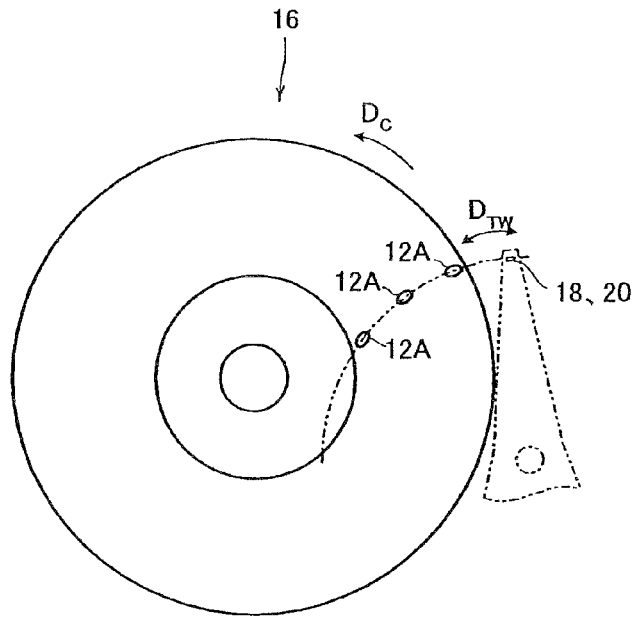
FIG. 5 is a plan view schematically illustrating the relationship between the radial position in the magnetic recording medium and the orientation of recording elements.

On the other hand, in this first exemplary embodiment, the recording element 12A is oriented (for example, with respect to the radial direction) differently depending on the radial position of the track 14 on which the recording element 12A is located. More specifically, as shown in FIG. 5, the heating head 18 and the recording head 20 are moved along an arc-shaped trajectory in the track width direction $D_{TW}$ in close proximity to the surface of the magnetic recording medium 16 and then. Accordingly, the orientation of the heating head 18 and the recording head 20 with respect to the magnetic recording medium 16 varies depending on the radial position in the magnetic recording medium 16. Each of the recording elements 12A is disposed so that its major axis or minor axis is oriented along the arc-shaped trajectory of the heating head 18 and the recording head 20 at the position at which the recording element 12A is located, or alternatively, in parallel to the tangent to the arc-shaped trajectory. FIG. 4 shows a region corresponding to an intermediate position and its vicinity in the radial direction in the magnetic recording medium 16. On the other hand, FIG. 6 shows a region corresponding to the outer circumference and its vicinity of the magnetic recording medium 16. Suppose that the recording element 12A has such an elliptic shape that its length $B_L$ in the circumferential direction $D_C$ is shorter than its width $B_W$ in the track width direction $D_{TW}$. In this case, the length $B_L$ of the recording element 12A in the circumferential direction $D_C$ is the minimum at a region corresponding to the intermediate position and its vicinity in the radial direction in the magnetic recording medium 16. The farther the recording element 12A is located radially inwardly or outwardly away from this region, the longer the length $B_L$ in the circumferential direction $D_C$ becomes. On the other hand, in this case, the width $B_W$ of the recording element 12A in the track width direction $D_{TW}$ is the maximum at a region corresponding to the intermediate position and its vicinity in the radial direction in the magnetic recording medium 16. The farther the recording element 12A is located radially inwardly or outwardly away from this region, the shorter the width $B_W$ in the track width direction $D_{TW}$ becomes. In other words, the width of the track 14 in the track width direction $D_{TW}$ is the maximum at a region corresponding to the intermediate position and its vicinity in the radial direction in the magnetic recording medium 16. The farther the track 14 is located radially inwardly or outwardly away from this region, the shorter the width of the track 14 becomes. Additionally, the length $G_L$ of a gap between the recording elements 12A in the circumferential direction $D_C$ is the maximum at a region corresponding to the intermediate position and its vicinity in the radial direction in the magnetic recording medium 16. The farther the gap is located radially inwardly or outwardly away from this region, the shorter the length $G_L$ of a gap between the recording elements 12A in the circumferential direction $D_C$ becomes. Additionally, the width $G_W$ of a gap between the tracks 14 in the track width direction $D_{TW}$ is the minimum at a region corresponding to the intermediate position and its vicinity in the radial direction in the magnetic recording medium 16. The farther the gap is located radially inwardly or outwardly away from this region, the greater the width $G_W$ of the gap becomes. In this manner, the length $B_L$ of the recording elements 12A in the circumferential direction $D_C$, the width $B_W$ of the recording elements 12A in the track width direction $D_{TW}$, the length $G_L$ of a gap between the recording elements 12A in the circumferential direction $D_C$, and the width $G_W$ of a gap between the tracks 14 in the track width direction $D_{TW}$ of the recording element 12A vary depending on the radial position in the magnetic recording medium 16. However, the magnetic recording apparatus 10 satisfies the relationships expressed by the equation (I) above and equation (III) discussed below, in each of the tracks 14. Additionally, the magnetic recording apparatus 10 preferably satisfies the relationships expressed by equations (II) and (IV), to be discussed below, in each of the tracks 14. Note that the width $G_W$ of a gap between the tracks 14 in the track width direction $D_{TW}$ is the width of a gap adjacent to each of the tracks 14. The length $B_L$ of the recording element 12A in the circumferential direction $D_C$ is specifically, for example, 5 to 200 nm. Additionally, the width $B_W$ of the recording element 12A in the track width direction $D_{TW}$ is specifically, for example, 10 to 250 nm. The length $G_L$ of a gap between the recording elements 12A in the circumferential direction $D_C$ is specifically, for example, 5 to 200 nm. Additionally, the width $G_W$ of a gap between the tracks 14 in the track width direction $D_{TW}$ is specifically, for example, 10 to 250 nm.

As the filler 32, it is possible to employ, for example, an oxide such as $SiO_2$, $Al_2O_3$, $TiO_2$, $ZrO_2$, or ferrite; a nitride such as AlN; a carbide such as SiC; non-magnetic metal like C(carbon), Si, Ge, Cu, or Cr; or a resin material.

Figure 3:
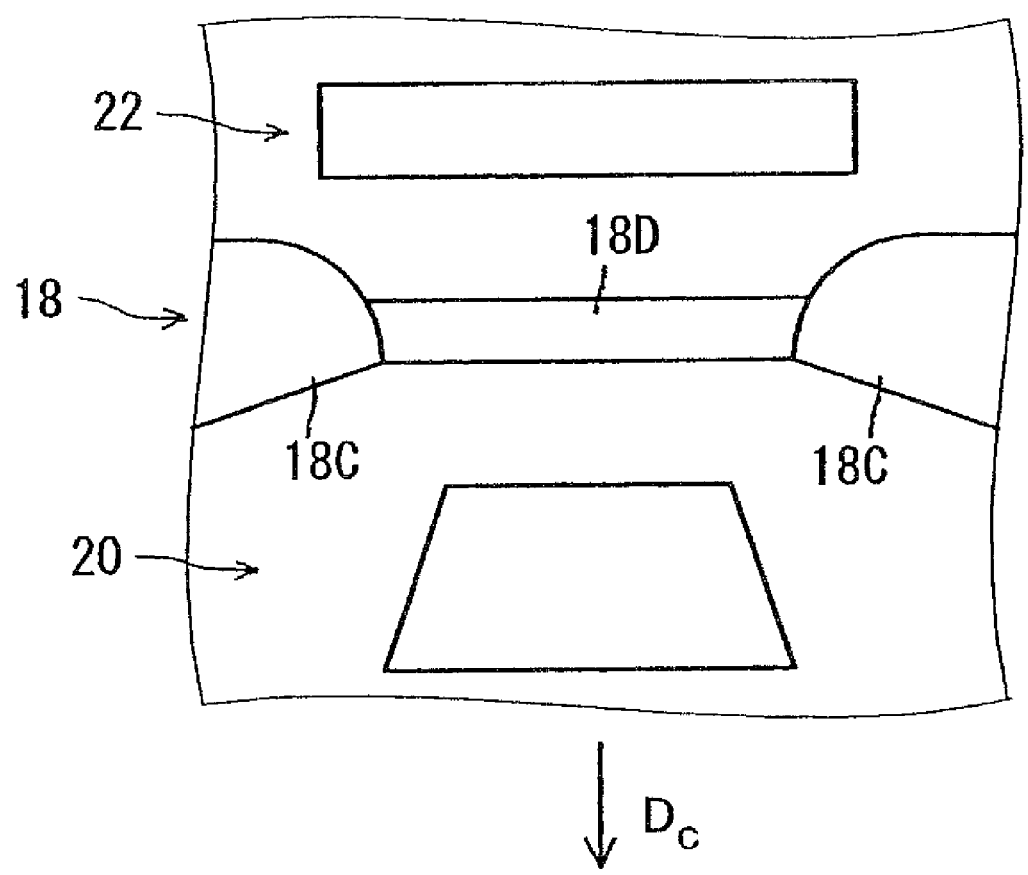
FIG. 3 is a plan view, taken along line III-III of FIG. 1, illustrating a heating head, a recording head, and a reproducing head when viewed from the magnetic recording medium.

The heating head 18 is disposed in close proximity to the top surface of the magnetic recording medium 16 to irradiate the magnetic recording medium 16 with near-field light, thereby locally heating the magnetic recording medium 16. More specifically, as shown in FIGS. 2 and 3, the heating head 18 includes a light source unit 18A, a waveguide layer 18B, opposing metal layers 18C, and a near-field light gap portion 18D. The light source unit 18A, which includes a laser diode or the like, is designed to emit light toward the upper end of the waveguide layer 18B (the end opposite to the magnetic recording medium 16). The waveguide layer 18B is a thin-film member whose thickness in the circumferential direction $D_C$ of the magnetic recording medium 16 is less than its width in the track width direction $D_{TW}$ and whose upper end width is greater than the width of the lower end closer to the magnetic recording medium 16. The waveguide layer 18B can be made of a dielectric material such as $SiO_2$, $Al_2O_3$, $Ta_2O_5$, $Nb_2O_5$, TiO, or $TiO_2$. The opposing metal layers 18C are disposed in pair along respective sides of the waveguide layer 18B in the track width direction $D_{TW}$. The opposing metal layers 18C can be made of metal such as Au, Pd, Pt, Rh, or Ir; an alloy of these metals; or an electrical conductor of these metals or alloys doped with Al or Cu. The near-field light gap portion 18D is provided at the lower end of the waveguide layer 18B. The near-field light gap portion 18D can be made of the same material as that of the waveguide layer 18B. The width of the near-field light gap portion 18D in the track width direction $D_{TW}$ is 10 to 300 nm. The length of the near-field light gap portion 18D in the circumferential direction $D_C$ is 10 to 200 nm. Additionally, the thickness of the near-field light gap portion 18D in the thickness direction of the magnetic recording medium is 10 to 500 nm. The arrows shown under the near-field light gap portion 18D in FIG. 2 schematically illustrate the light emitted from the heating head 18 to the recording element 12A through the near-field light gap portion 18D.

The recording head 20 is also disposed in close proximity to the top surface of the magnetic recording medium 16. Additionally, the recording head 20 is disposed near the heating head 18 on its downstream side with respect to the travel direction of the magnetic recording medium 16 (in FIGS. 1 and 3, in the direction shown by an arrow in the circumferential direction $D_C$). The recording head 20, which has a monopole magnetic head, is designed to apply to the recording element 12A a recording magnetic field perpendicular to the surface of the magnetic recording medium 16. The arrows shown below the recording head 20 in FIG. 1 schematically illustrate the recording magnetic field that the recording head 20 applies to the recording element 12A from the monopole magnetic head. Note that the recording head 20 also includes an auxiliary magnetic pole, solenoid coil or the like; however, those components such as the auxiliary magnetic pole and the solenoid coil will not be illustrated and explained.

The reproducing head 22 is also disposed in close proximity to the top surface of the magnetic recording medium 16. Additionally, the reproducing head 22 is disposed near the heating head 18 on its upstream side with respect to the travel direction of the magnetic recording medium 16 (in FIGS. 1 and 3, opposite side to the direction shown by the arrow in the circumferential direction $D_C$).

Figure 7:
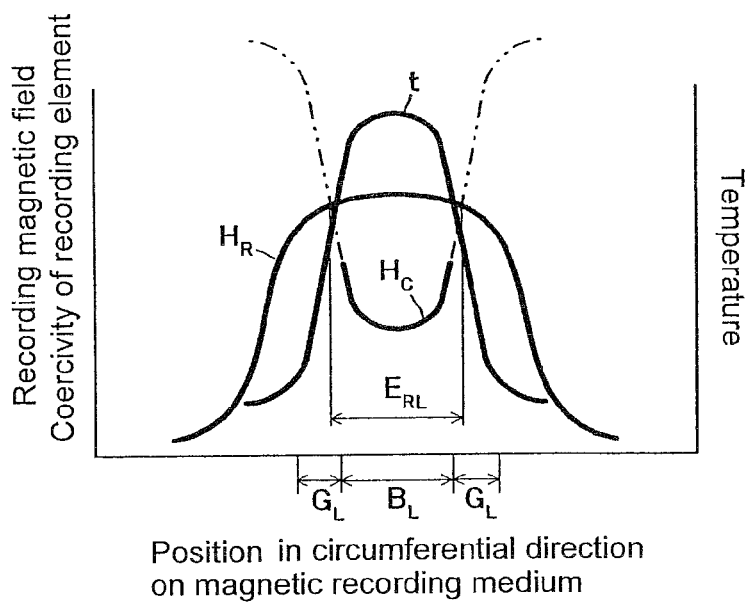
FIG. 7 is a graph schematically illustrating the distribution of the recording magnetic field, coercivity, and temperature on the magnetic recording medium in the circumferential direction.
Figure 8:
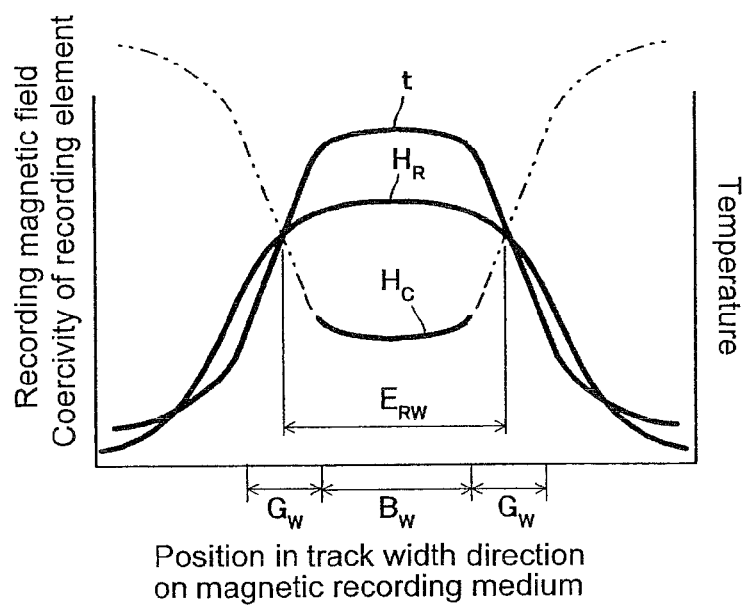
FIG. 8 is a graph schematically illustrating the distribution of the recording magnetic field, coercivity, and temperature on the magnetic recording medium in the track width direction.

Suppose that the recording layer 12 is formed uniformly over the entire surface of the recording medium 16 (i.e., the recording layer 12 is formed even in the concave portion between the recording elements 12A). In this case, the effective recording area $E_R$ is a region which is created by the heating head 18 and the recording head 20 on the magnetic recording medium 16 and in which the recording magnetic field $H_R$ is greater than the coercivity $H_C$ of the recording layer 12 as shown in FIGS. 7 and 8, allowing magnetic data to be recordable and erasable. Note that of the curves representing the coercivity $H_C$ of the recording layer 12 in FIGS. 7 and 8, the solid line shows the distribution of the coercivity of the recording element 12A, while the chain double-dashed line shows the distribution of the coercivity of a portion between the recording elements 12A when the recording layer 12 is assumed to be formed uniformly over the entire surface of the recording medium 16. It is possible to adjust the heating duration of the heating head 18 for recording magnetic data on a target recording element 12A or the duration of application of the recording magnetic field from the recording head 20 to thereby increase or decrease the effective recording length $E_{RL}$ of the effective recording area $E_R$. However, in this first exemplary embodiment, the shape of the effective recording area $E_R$ in a plan view when viewed in the thickness direction of the magnetic recording medium 16 is the shape of a region which is created on the magnetic recording medium 16 by the heating head 18 and the recording head 20 when the heating duration of the heating head 18 and the duration of application of the recording magnetic field from the recording head 20 are set to significantly reduced times. Accordingly, in this first exemplary embodiment, the shape of the effective recording area $E_R$ in a plan view when viewed in the thickness direction of the magnetic recording medium 16 is generally constant irrespective of the radial position of the track 14. Additionally, the shape of the effective recording area $E_R$ in a plan view when viewed in the direction of thickness of the magnetic recording medium 16 is generally elliptic just like the recording element 12A. Note that like the recording element 12A, the effective recording area $E_R$ is also created on the magnetic recording medium 16 such that its major axis or minor axis is oriented along the arc-shaped trajectory of the heating head 18 and the recording head 20 at the position where the effective recording area $E_R$ is created or in parallel to the tangent to the arc-shaped trajectory. Additionally, in a plan view, the recording element 12A and the effective recording area $E_R$ are generally similar to each other in shape. Additionally, in a plan view, the effective recording area $E_R$ is greater than the recording element 12A in shape. Accordingly, the effective recording area $E_R$ has the shape that can include the recording element 12A within it.

Additionally, in each of the tracks 14, the end of the recording element 12A in the track width direction $D_{TW}$ is generally aligned with the end of the track 14 in the track width direction $D_{TW}$. The magnetic recording apparatus 10 satisfies the following equation (III), $$B_W \leq E_{RW} \leq B_W + 2 \times G_W \quad \text{(Equation (III))}$$

where $B_W$ represents the width of the recording element 12A in the track width direction $D_{TW}$, $G_W$ represents the width of a gap between the tracks 14 in the track width direction $D_{TW}$, and $E_{RW}$ represents an effective recording width which is the width of the effective recording area $E_R$ in the track width direction $D_{TW}$.

A description will now be made to the operation of the magnetic recording apparatus 10.

First, the operation for recording magnetic data will be described. While the magnetic recording medium 16 is being driven along the arrow in the circumferential direction $D_C$ as shown, for example, in FIG. 1, the heating head 18 irradiates the target recording element 12A with light in accordance with, for example, servo information recorded in the servo area of the magnetic recording medium 16. This causes the portion of the magnetic recording medium 16 irradiated with the light and a region Al which corresponds to the irradiated portion and its vicinity to be heated and increased in temperature, thus providing a temperature distribution as shown with a symbol t in FIGS. 7 and 8. This causes the coercivity of the recording element 12A within the region Al to decrease, thus providing the distribution of coercivity as shown with a symbol $H_C$ in FIGS. 7 and 8. Note that an isothermal contour of the region Al is generally elliptic. The elliptic shape indicated with a chain double-dashed line represented by the symbol Al in FIGS. 4 and 6 schematically illustrates, as the general shape of the region Al, an intermediate temperature contour in the temperature distribution of the region Al. The recording element 12A, which is mainly composed of metal, has a good heat conductivity and can thus be heated with efficiency. On the other hand, the filler 32, which is lower in thermal conductivity than the recording element 12A and filled in the concave portion between the recording elements 12A, prevents heat from being transferred from the target recording element 12A to its adjacent recording elements 12A.

When the recording head 20 applies the recording magnetic field to the recording element 12A heated, the recording magnetic field is applied to a region A2 of the magnetic recording medium 16, thus providing the distribution of the recording magnetic field within the region A2 as shown with a symbol $H_R$ in FIGS. 7 and 8. Note that the points equal in intensity of the recording magnetic field applied provide a generally rectangular contour. The generally rectangular shape indicated with a chain double-dashed line represented by the symbol A2 in FIGS. 4 and 6 schematically illustrates, as the general shape of the region A2, the contour of those points having an intermediate intensity of the recording magnetic field $H_R$ in the distribution of the recording magnetic field of the region A2. In this first exemplary embodiment, a region where the coercivity $H_C$ of the recording layer 12 is reduced to less than the maximum value of the recording magnetic field $H_R$ or a value close to it due to the heating is narrower than a region where the intensity of the recording magnetic field $H_R$ of the recording head 20 is the maximum value or the value close to it and gradually changes around the maximum value depending on positions. Accordingly, the shape of the effective recording area $E_R$ mainly depends on the shape of the region Al formed by the heating head 18 and is thus generally elliptic. Magnetic data can be recorded on a portion within the effective recording area $E_R$ of the recording layer 12 where the recording magnetic field $H_R$ from the recording head 20 is equal to or greater than the coercivity $H_C$ of the recording element 12A. However, in practice, the recording layer 12 is formed restrictively within the recording element 12A, and the effective recording length $E_{RL}$ of the effective recording area $E_R$ in the circumferential direction $D_C$ satisfies the equation (I). Therefore, the target recording element 12A is magnetized or reversed in the orientation of magnetization from one end of the recording element 12A to the other end in the circumferential direction $D_C$.

Additionally, the effective recording width $E_{RW}$ of the effective recording area $E_R$ in the track width direction $D_{TW}$ satisfies the equation (III). Therefore, the target recording element 12A is magnetized or reversed in the orientation of magnetization from one end of the recording element 12A to the other end in the track width direction $D_{TW}$.

This ensures that the magnetic data is recorded on the entire target recording element 12A. Additionally, since the effective recording length $E_{RL}$ satisfies the equation (I) above, erroneous recording of the magnetic data onto another recording element 12A adjacent to the target recording element 12A in the circumferential direction $D_C$ is prevented. Likewise, since the effective recording width $E_{RW}$ satisfies the equation (III) above, erroneous recording of the magnetic data onto another recording element 12A adjacent to the target recording element 12A in the track width direction $D_{TW}$ is also prevented. That is, the magnetic data is recorded only on the target recording element 12A.

A description will now be given to the operation for reproducing magnetic data. While the magnetic recording medium 16 is being driven along the arrow in the circumferential direction $D_C$ as shown, for example, in FIG. 1, the reproducing head 22 senses the reproducing magnetic field of each recording element 12A, thereby reproducing the magnetic data. The magnetic recording apparatus 10 ensures the reproduction of the magnetic data because the magnetic data has been reliably recorded only on the target recording element 12A. That is to say, the magnetic data can be reliably recorded and reproduced even if the target recording element 12A on which the magnetic data is recorded has a fine structure. It is thus possible to manage with high areal density and good recording/reproducing accuracy.

Furthermore, what is required for the effective recording length $E_{RL}$ and the effective recording width $E_{RW}$ is to meet the equations (I) and (III) even if the length $B_L$ of the recording element 12A in the circumferential direction $D_C$ and the width $B_W$ in the track width direction $D_{TW}$ are minute. Therefore, this accordingly provides a greater allowance for variations in the temperature distribution of the heated portion of the recording element 12A and for variations in the distribution of the recording magnetic field. This makes it easier to realize the apparatus.

Additionally, in a plan view, the recording element 12A and the effective recording area $E_R$ are generally similar to each other in shape. This allows for reducing the area of the effective recording area $E_R$ created on a portion surrounding the target recording element 12A, where the portion makes no contribution to the recording of the magnetic data. This contributes to reduction of power consumption.

Additionally, the shape of the recording element 12A, the pitch of the recording elements 12A in the circumferential direction $D_C$, and the shape of the effective recording area $E_R$ are substantially constant irrespective of the radial position in the magnetic recording medium 16. Moreover, the relationship between the orientation of the recording element 12A and that of the effective recording area $E_R$ is constant irrespective of the radial position in the magnetic recording medium 16. These features contribute to facilitating of control for recording magnetic data.

Note that as described above, the magnetic recording medium 16 is driven by a motor (not shown) to rotate. The rotational speed of the magnetic recording medium 16 can be controlled. However, during recording, there may occur a deviation in the circumferential direction $D_C$ between the target recording element 12A and the effective recording area $E_R$ due to vibrations of the motor or errors in synchronization timing. This deviation in the circumferential direction $D_C$ is referred to as jitter.

Figure 9:
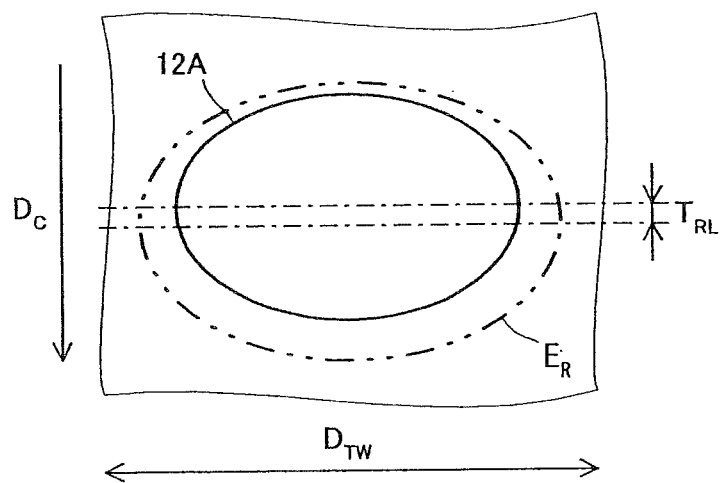
FIG. 9 is a magnified plan view schematically illustrating the magnetic recording medium with an effective recording area being deviated from a target recording element in the circumferential direction.

In this first exemplary embodiment, as described above, the length $B_L$ of the recording element 12A in the circumferential direction, the length $G_L$ of a gap between the recording elements 12A in the circumferential direction $D_C$, and the effective recording length $E_{RL}$ of the effective recording area $E_R$ in the circumferential direction $D_C$ created by the heating head 18 and the recording head 20 on the magnetic recording medium 16 satisfy the equation (I) as mentioned previously. Additionally, it is preferable to satisfy the following equation (II), $$B_L+2\times T_{RL} \leq E_{RL} \leq B_L+2\times G_L-2\times T_{RL} \quad \text{(Equation (II))}$$

where $T_{RL}$ represents a recording deviation in the circumferential direction $D_C$ or the upper limit of the amount of deviation in the circumferential direction $D_C$ that occurs during recording between the target recording element 12A of the recording elements 12A and the effective recording area $E_R$. This makes it possible to ensure that the magnetic data is recorded only on the target recording element 12A even when there is a deviation $T_{RL}$ in the circumferential direction $D_C$, as shown in FIG. 9, between the effective recording area $E_R$ created by the heating head 18 and the recording head 20 on the magnetic recording medium 16 and the target recording element 12A.

Figure 10:
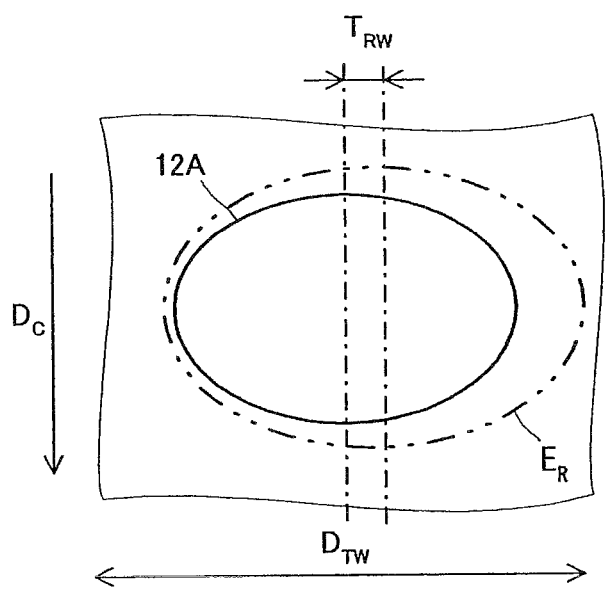
FIG. 10 is a magnified plan view schematically illustrating the magnetic recording medium with the effective recording area being deviated from a target recording element in the track width direction.

Additionally, the positions of the heating head 18 and the recording head 20 in the track width direction $D_{TW}$ can be controlled in accordance with a servo signal (burst signal) recorded on the servo area of the magnetic recording medium 16. However, this control is intended to correct deviation in the track width direction $D_{TW}$ from the target track 14. In other words, it is presupposed that there be a certain range of deviation between the target track 14 and the positions of the heating head 18 and the recording head 20 in the track width direction $D_{TW}$. It is preferable to satisfy the following equation (IV), $$B_W+2\times T_{RW} \leq E_{RW} \leq B_W+2\times G_W-2\times T_{RW} \quad \text{(Equation (IV))}$$

where $T_{RW}$ represents a recording deviation in the track width direction $D_{TW}$ or the design upper limit of the amount of deviation occurring during recording in the track width direction $D_{TW}$ between the track 14 on which the target recording element 12A is located and the effective recording area $E_R$. This makes it possible to ensure that the magnetic data is recorded only on the target recording element 12A even when there is a deviation $T_{RW}$ in the track width direction $D_{TW}$, as shown in FIG. 10, between the effective recording area $E_R$ created by the heating head 18 and the recording head 20 on the magnetic recording medium 16 and the target recording element 12A.

Figure 11:
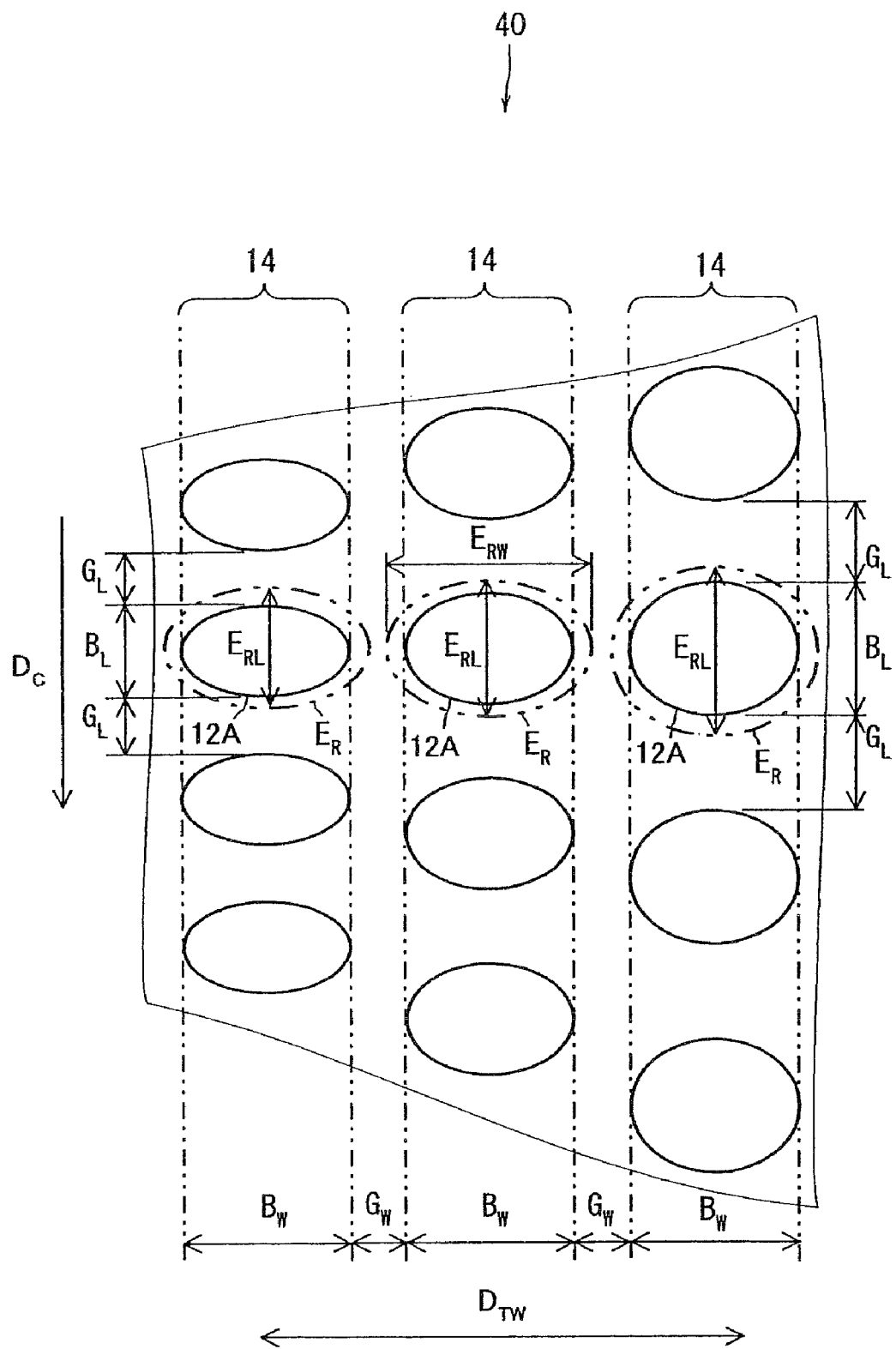
FIG. 11 is a plan view schematically illustrating the structure of a magnetic recording medium according to a second exemplary embodiment of the present invention when viewed from the recording head.

A description will now be made to a second exemplary embodiment of the present invention. In the first exemplary embodiment, the shape of the recording element 12A, the pitch of the recording element 12A in the circumferential direction $D_C$, and the shape of the effective recording area $E_R$ are generally constant irrespective of the radial position of the associated track 14. In contrast to this, as shown in FIG. 11, a magnetic recording medium 40 according to the second exemplary embodiment is configured such that the shape of the recording element 12A and the pitch of the recording element 12A in the circumferential direction $D_C$ vary depending on the (radial) position of the track 14 in the track width direction $D_{TW}$. More specifically, in FIG. 11, the left side is closer to the center of rotation of the magnetic recording medium 40 and the radius increases as the track 14 is located farther to the right. The length $B_L$ of the recording element 12A in the circumferential direction $D_C$ is relatively long on the track 14 of a greater radius and relatively short on the track 14 of a smaller radius. Additionally, the pitch of the recording element 12A in the circumferential direction $D_C$ is relatively long on the track 14 of a greater radius and relatively short on the track 14 of a smaller radius. Additionally, in the second exemplary embodiment, the effective recording area $E_R$ created by the heating head 18 and the recording head 20 on the magnetic recording medium 40 is associated with the shape of the recording element 12A of the magnetic recording medium 40. More specifically, the effective recording area $E_R$ is created so that the effective recording length $E_{RL}$ in the circumferential direction $D_C$ is relatively long on the track 14 of a greater radius and relatively short on the track 14 of a smaller radius. Note that for purposes of understanding the second exemplary embodiment, FIG. 11 shows exaggerated relationships between the shape of the recording element 12A and the position of the track 14 in the track width direction $D_{TW}$, between the pitch of the recording element 12A in the circumferential direction $D_C$ and the position of the track 14 in the track width direction $D_{TW}$, and between the shape of the effective recording area $E_R$ and the position of the track 14 in the track width direction $D_{TW}$. Like the first exemplary embodiment, also in this second exemplary embodiment, the orientation (for example, with respect to radial orientation) of the recording element 12A differs depending on the radial position of the track 14 on which the recording element 12A is located. However, FIG. 11 is illustrated for convenience in a manner such that those recording elements 12 located on different tracks 14 are oriented in the same direction.

Other aspects of the configuration are the same as those of the first exemplary embodiment, and thus will be illustrated using the same reference numerals and symbols as those used in FIGS. 1 to 10 without any further explanation thereof.

The effective recording area $E_R$ is created in different shapes on each of the tracks 14 of the magnetic recording medium 16 so that the effective recording length $E_{RL}$ satisfies the equation (I) mentioned above like the first exemplary embodiment. As described above, the heating duration of the heating head 18 for recording magnetic data on the target recording element 12A and the duration of application of the recording magnetic field from the recording head 20 can be adjusted, thereby increasing or decreasing the effective recording length $E_{RL}$ of the effective recording area $E_R$. Note that like the first exemplary embodiment, the length $B_L$ of the recording element 12A in the circumferential direction $D_C$, the width $B_W$ in the track width direction $D_{TW}$, the length $G_L$ of a gap between the recording elements 12A in the circumferential direction $D_C$, and the width $G_W$ of a gap between the tracks 14 in the track width direction $D_{TW}$ vary depending on the radial position in the magnetic recording medium 40. However, the magnetic recording apparatus 10 satisfies the relationships expressed by the equation (I) and equation (III) in each of the tracks 14. It is preferable that the magnetic recording apparatus 10 satisfies the relationships expressed by the equations (II) and (IV) in each of the tracks 14 as well.

In this manner, the length $B_L$ of the recording element 12A in the circumferential direction $D_C$ is relatively long on the track 14 of a greater radius and relatively short on the track 14 of a smaller radius. Moreover, the pitch of the recording element 12A in the circumferential direction $D_C$ is also relatively long on the track 14 of a greater radius and relatively short on the track 14 of a smaller radius. It is thus possible to employ the same frequency for recording or reproducing magnetic data on the tracks 14 of different radii or reduce the difference between the frequencies for recording or reproducing magnetic data on the tracks 14 of different radii.

Additionally, the effective recording area $E_R$ is created corresponding to the shape of the recording element 12A of the magnetic recording medium 40 so as to satisfy the equations (I) and (II) to (IV), in a manner such that the effective recording length $E_{RL}$ in the circumferential direction $D_C$ is relatively long on the track 14 of a greater radius and relatively short on the track 14 of a smaller radius. Like the first exemplary embodiment, it is thus possible to reliably record magnetic data only on the target recording element 12A and as well, reliably reproduce the magnetic data.

Additionally, in a plan view, the recording element 12A and the effective recording area $E_R$ are generally similar to each other in shape. This allows for reducing the area of the effective recording area $E_R$ created on a portion surrounding the target recording element 12A, where the portion makes no contribution to the recording of the magnetic data. This contributes to reduction of power consumption.

Figure 12:
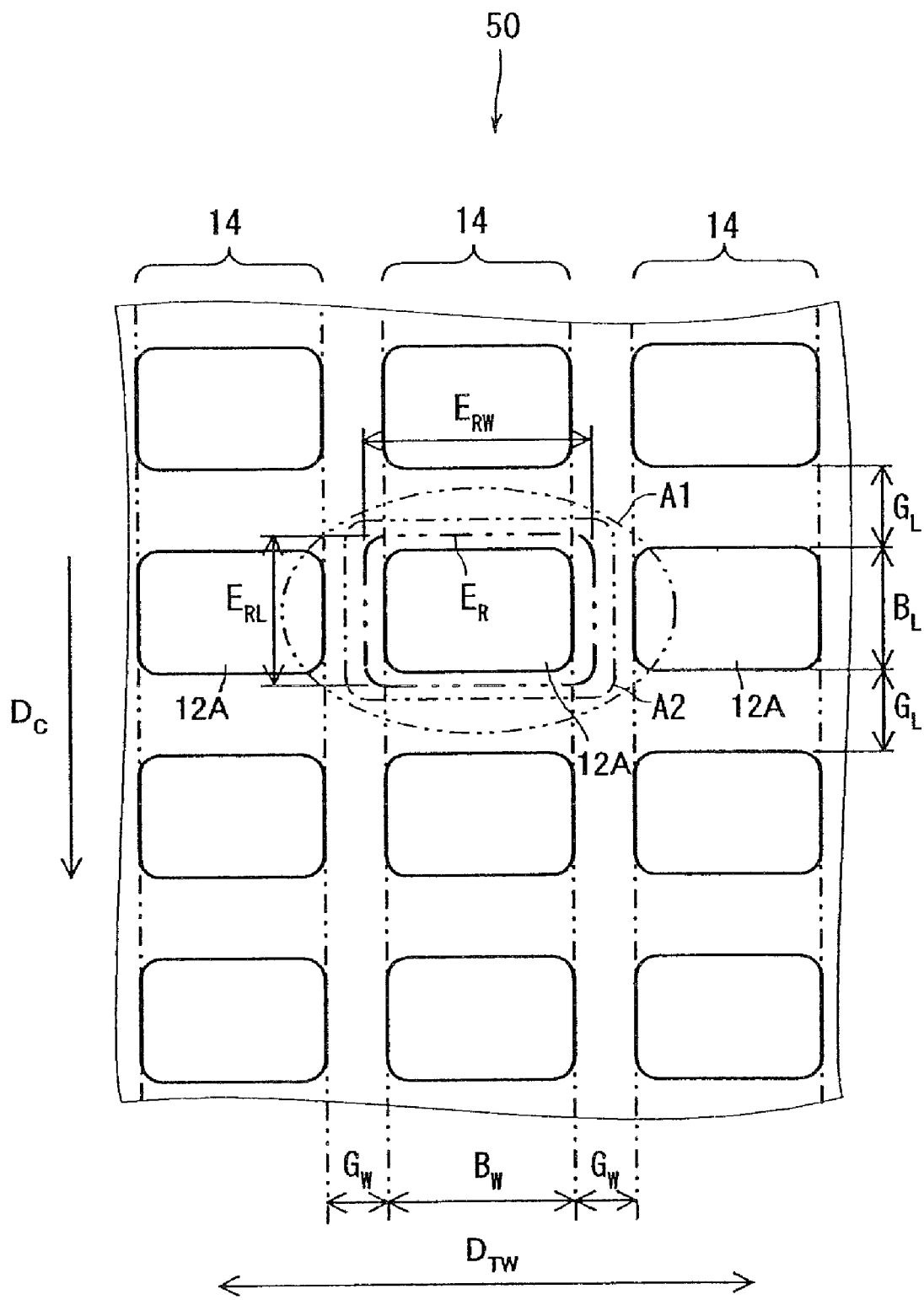
FIG. 12 is a plan view schematically illustrating the structure of a magnetic recording medium according to a third exemplary embodiment of the present invention when viewed from the recording head.
Figure 13:
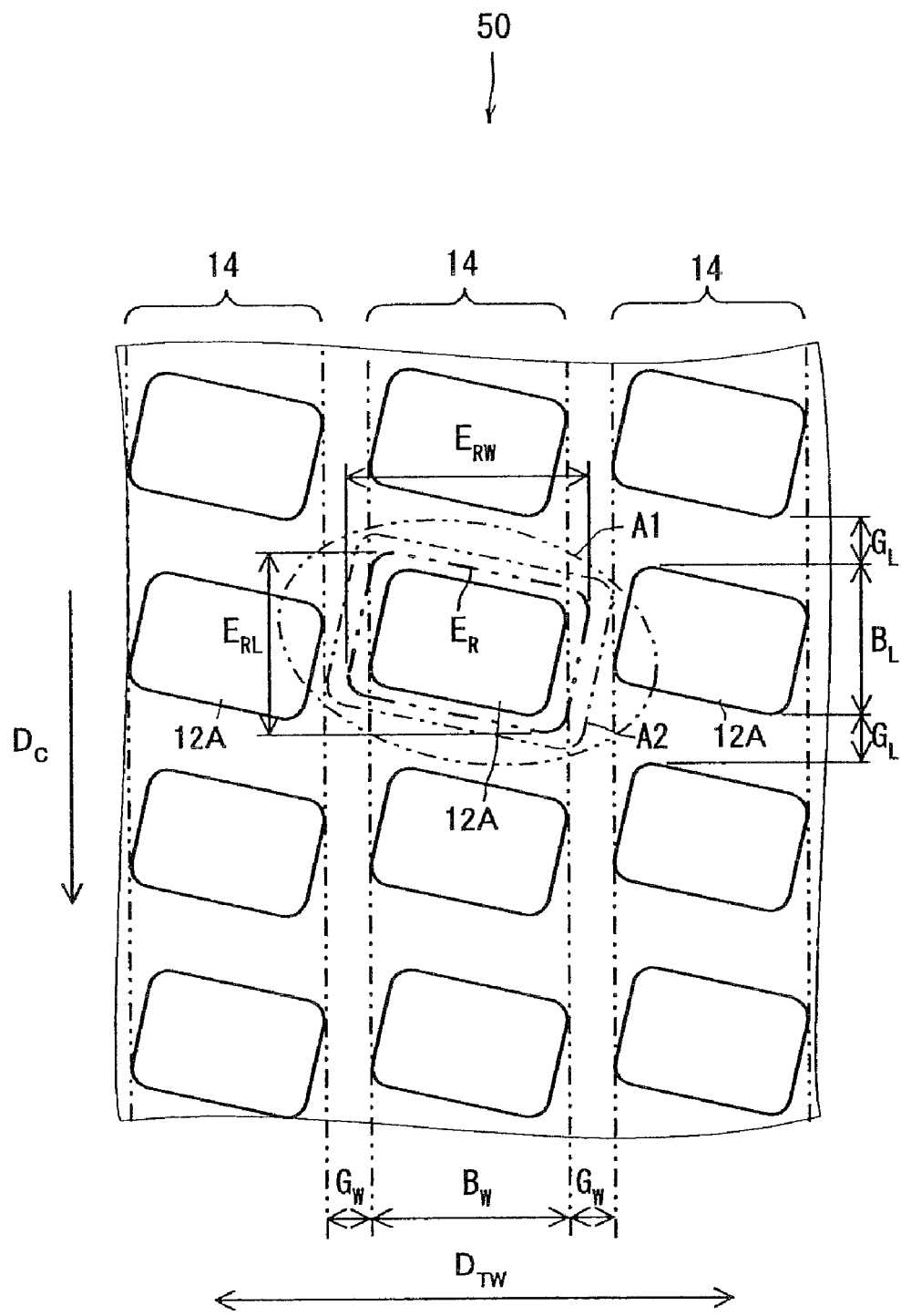
FIG. 13 is a plan view illustrating the magnetic recording medium at a radial position different from that of FIG. 12.
Figure 14:
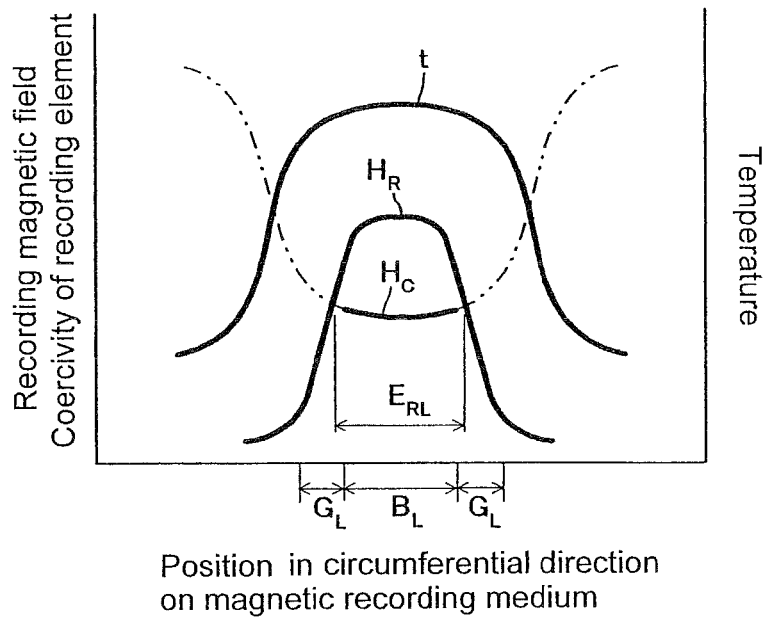
FIG. 14 is a graph schematically illustrating the distribution of the recording magnetic field, coercivity, and temperature on the magnetic recording medium in the circumferential direction.
Figure 15:
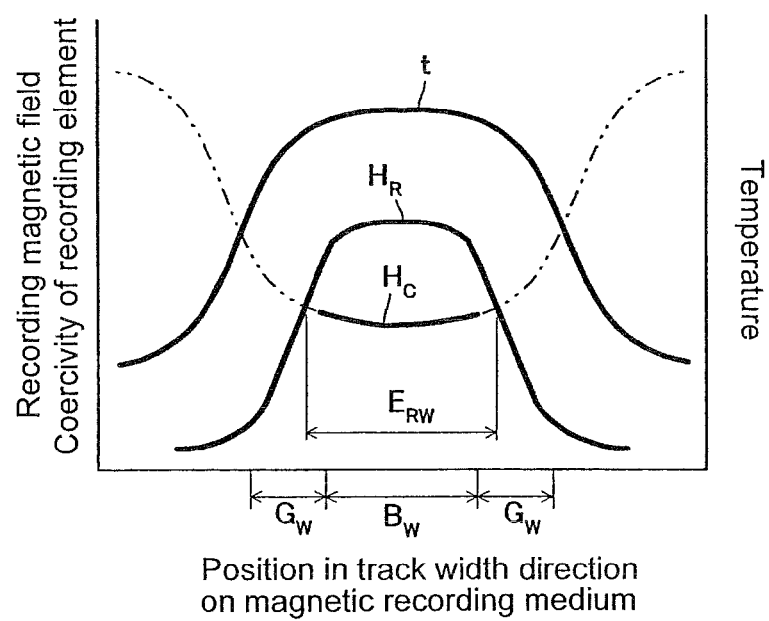
FIG. 15 is a graph schematically illustrating the distribution of the recording magnetic field, coercivity, and temperature on the magnetic recording medium in the track width direction.

A description will now be made to a third exemplary embodiment of the present invention. In the first and second exemplary embodiments, the shape of each of the recording elements 12A and the shape of the effective recording area $E_R$ are generally elliptic in a plan view when viewed in a direction of thickness of the magnetic recording medium 16 or 40. In contrast to this, as shown in FIGS. 12 and 13, a magnetic recording medium 50 according to the third exemplary embodiment is characterized in that the shape of the recording element 12A and the shape of the effective recording area $E_R$ are generally similar and generally rectangular. Additionally, the third exemplary embodiment has employed such a combination of the heating head 18 and the recording head 20 that provides the temperature distribution within the region A1, the coercivity distribution of the recording element 12A within the region A1, and the recording magnetic field distribution within the region A2 as shown in FIGS. 14 and 15. The other aspects of the configuration are the same as those of the first and second exemplary embodiments, and thus will be illustrated using the same reference numerals and symbols as those used in FIGS. 1 to 11 without any additional explanation thereof.

In this manner, even if the recording element 12A and the effective recording area $E_R$ are generally rectangular in shape, the effective recording area $E_R$ is created corresponding to the shape of the recording element 12A so as to satisfy the equations (I) and (II) to (IV). It is thus possible to reliably record magnetic data only on the target recording element 12A and as well, reliably reproduce the magnetic data like the first and second exemplary embodiments described above.

Additionally, in a plan view, the recording element 12A and the effective recording area $E_R$ are generally similar to each other in shape. This allows for reducing the area of the effective recording area $E_R$ created on a portion surrounding the target recording element 12A, where the portion makes no contribution to the recording of the magnetic data. This contributes to reduction of power consumption.

Note that FIG. 12 shows a region corresponding to an intermediate position and its vicinity in the radial direction in the magnetic recording medium 50. On the other hand, FIG. 13 shows a region corresponding to the outer circumference and its vicinity of the magnetic recording medium 50. Suppose that the recording element 12A has a rectangular shape such that its length $B_L$ in the circumferential direction $D_C$ is shorter than its width $B_W$ in the track width direction $D_{TW}$. In this case, the length $B_L$ of the recording element 12A in the circumferential direction $D_C$ is the minimum at a region corresponding to the intermediate position and its vicinity in the radial direction in the magnetic recording medium 50. The farther the recording element 12A is located radially inwardly or outwardly away from this region, the longer the length $B_L$ in the circumferential direction $D_C$ becomes. Further, the width $B_W$ of the recording element 12A in the track width direction $D_{TW}$ is also the minimum at a region corresponding to the intermediate position and its vicinity in the radial direction in the magnetic recording medium 50. The farther the recording element 12A is located radially inwardly or outwardly away from this region, the greater the width $B_W$ in the track width direction $D_{TW}$ becomes. In other words, the width of the track 14 in the track width direction $D_{TW}$ is the minimum at a region corresponding to the intermediate position and its vicinity in the radial direction in the magnetic recording medium 50. The farther the track 14 is located radially inwardly or outwardly away from this region, the greater the width of the track 14 becomes.

Note that, as in FIGS. 4 and 6, the elliptic shape indicated with a chain double-dashed line represented by the symbol A1 in FIGS. 12 and 13 schematically illustrates, as the general shape of the region A1, an intermediate temperature contour in the temperature distribution of the region A1. Further, the generally rectangular shape indicated with a chain double-dashed line represented by the symbol A2 schematically illustrates, as the general shape of the region A2, the contour of those points having an intermediate intensity of the recording magnetic field $H_R$ in the distribution of the recording magnetic field of the region A2.

As described above, the third exemplary embodiment provides the temperature distribution within the region A1, the coercivity distribution of the recording element 12A within the region A1, and the recording magnetic field distribution within the region A2 as shown in FIGS. 14 and 15. In the third exemplary embodiment, a region where the recording magnetic field $H_R$ from the recording head 20 is greater than the minimum value of the coercivity $H_C$ or a value close to the minimum value is narrower than a region where the coercivity $H_C$ of the recording layer 12 is reduced due to heating to take the minimum value or the value close to the minimum value and gradually changes around the minimum value depending on positions. Accordingly, the shape of the effective recording area $E_R$ mainly depends on the shape of the region A2 formed by the recording head 20 and is thus generally rectangular.

Note that like the first exemplary embodiment, the third exemplary embodiment shows an example in which the shape of the recording element 12A, the pitch of the recording element 12A in the circumferential direction $D_C$, and the shape of the effective recording area $E_R$ are generally constant irrespective of the radial position of the associated track 14. Alternatively, the shape of the recording element 12A and the pitch of the recording element 12A in the circumferential direction $D_C$ can also be designed to differ depending on the radial position of the associated track 14 as in the second exemplary embodiment.

Figure 16:
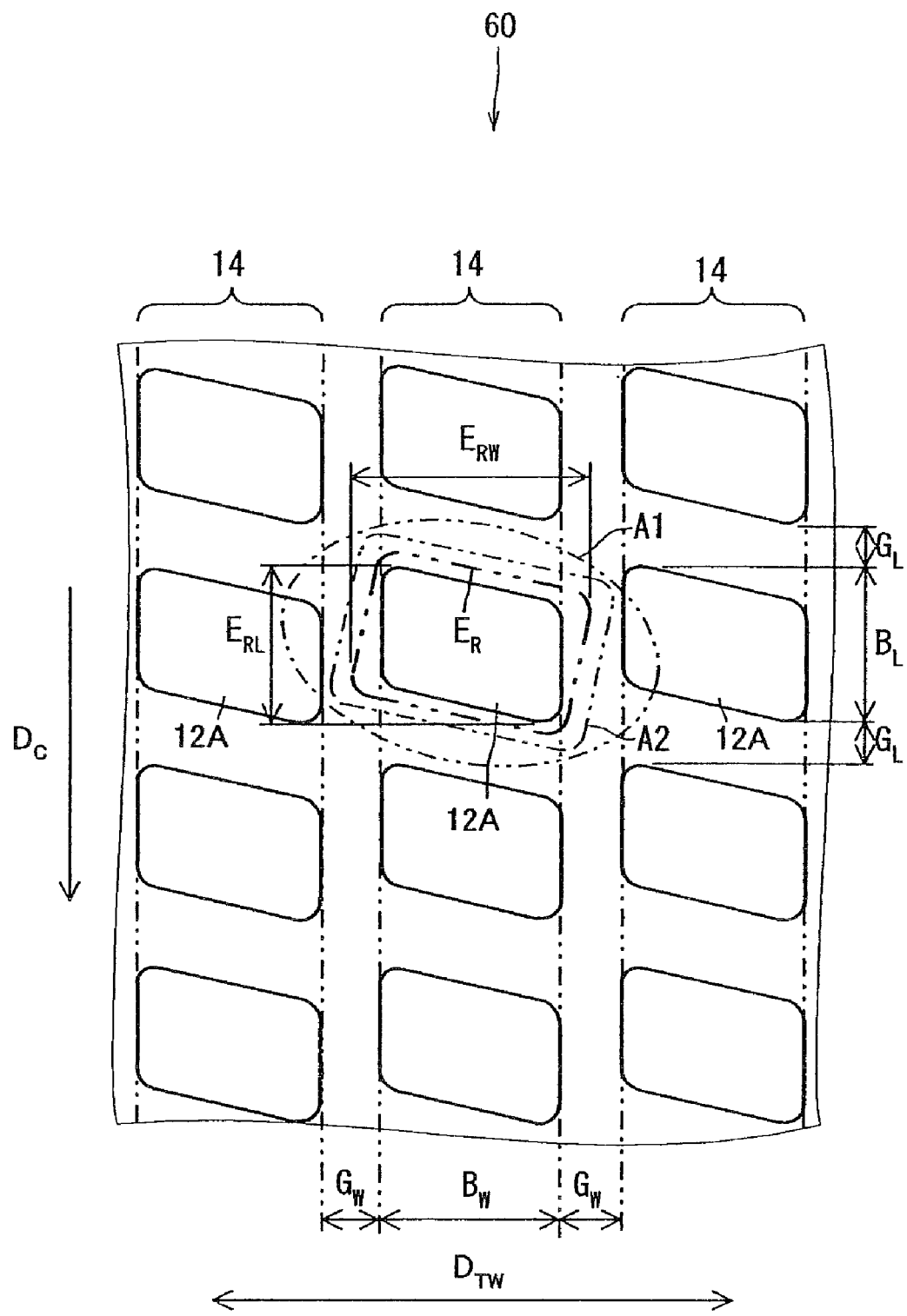
FIG. 16 is a plan view schematically illustrating the structure of a magnetic recording medium according to a fourth exemplary embodiment of the present invention when viewed from the recording head.

A description will now be made to a fourth exemplary embodiment of the present invention. In the third exemplary embodiment, each of the recording elements 12A and the effective recording area $E_R$ are generally rectangular in shape in a plan view when viewed in a direction of thickness of the magnetic recording medium 50 and generally similar to each other in shape. In contrast to this, as shown in FIG. 16, a magnetic recording medium 60 according to the fourth exemplary embodiment is characterized in that the recording element 12A is generally parallelogramic in shape. More specifically, a side of each of the generally parallelogramic recording elements 12A along the track width direction $D_{TW}$ is generally parallel to the tangent to the arc-shaped trajectory of the heating head 18 and the recording head 20 at a position at which each of the recording elements 12A is located. Accordingly, the shape of the recording element 12A of the magnetic recording medium 60 differs depending on the radial position of the track 14 at which the recording element 12A is located. On the other hand, like the third exemplary embodiment, the shape of the effective recording area $E_R$ is generally rectangular and is the same irrespective of the radial position of the track 14. Although the recording element 12A and the effective recording area $E_R$ are not generally similar to each other in shape, any of their sides along the track width direction $D_{TW}$ is generally parallel to the tangent to the arc-shaped trajectory of the recording head 20. FIG. 16 shows a region corresponding to the outer circumference and its vicinity of the magnetic recording medium 60. Note that the recording region 12A is generally rectangular in shape as in FIG. 12 at a region corresponding to the intermediate position and its vicinity in the radial direction in the magnetic recording medium 60, in which the recording element 12A and the effective recording area $E_R$ are similar to each other in shape. The other aspects of the configuration are the same as those of the first to third exemplary embodiments, and thus will be illustrated using the same reference numerals and symbols as those used in FIGS. 1 to 15 without any additional explanation thereof.

Even when the recording element 12A and the effective recording area $E_R$ are not similar to each other in shape as described above, any of their sides along the track width direction $D_{TW}$ is generally parallel to the tangent to the arc-shaped trajectory of the recording head 20. This provides a certain effect of reducing the area of the effective recording area $E_R$ created on a portion surrounding the target recording element 12A, where the portion makes no contribution to the recording of the magnetic data. This contributes to reduction of power consumption.

In this manner, even if the recording element 12A and the effective recording area $E_R$ are not generally similar to each other in shape, the effective recording area $E_R$ is created corresponding to the shape of the recording element 12A so as to satisfy the equations (I) and (II) to (IV). It is thus possible to reliably record magnetic data only on the target recording element 12A and as well, reliably reproduce the magnetic data like the first to third exemplary embodiments described above.

Additionally, the shape of the recording element 12A is made generally parallelogramic. This makes it possible to keep the width $B_W$ of the recording element 12A in the track width direction $D_{TW}$ constant irrespective of the radial position in the magnetic recording medium 16.

Note that the length $B_L$ of the recording element 12A in the circumferential direction $D_C$ can also be made constant irrespective of the radial position in the magnetic recording medium 16. In this case, the shape and position of the recording element 12A may be appropriately determined for each of the tracks 14 so as to reduce as much as possible the area of the effective recording area $E_R$ created at a portion around the target recording element 12A that does not contribute to recording of magnetic data.

Like the first exemplary embodiment, the fourth exemplary embodiment is related to an example in which the pitch of the recording element 12A in the circumferential direction $D_C$ and the shape of the effective recording area $E_R$ are generally constant irrespective of the (radial) position of the corresponding track 14 in the track width direction $D_{TW}$. However, as in the second exemplary embodiment, the pitch of the recording element 12A in the circumferential direction $D_C$ may also vary depending on the (radial) position of the corresponding track 14 in the track width direction $D_{TW}$.

Additionally, in the fourth exemplary embodiment, the effective recording area $E_R$ is generally rectangular in shape. However, as in the first exemplary embodiment, the shape of the effective recording area $E_R$ may be generally elliptic and the shape of the recording element 12A may be generally parallelogramic so that the recording element 12A and the effective recording area $E_R$ are not generally similar to each other in shape. Even in this case, the effective recording area $E_R$ can be created corresponding to the shape of the recording element 12A so as to satisfy the equations (I) and (II) to (IV). As in the first to third exemplary embodiments, it is thus possible to reliably record magnetic data only on the target recording element 12A and as well, reliably reproduce the magnetic data.

Furthermore, the first to fourth exemplary embodiments relate to such examples in which the recording element and the effective recording area are generally elliptic, generally rectangular, or generally parallelogramic to be longer in the track width direction $D_{TW}$ rather than in the circumferential direction $D_C$. However, so long as the equations (I) and (II) to (IV) are satisfied, the recording element and the effective recording area may also be shaped to be longer in the circumferential direction $D_C$ than in the track width direction $D_{TW}$. This makes it possible to increase the recording density in the track width direction $D_{TW}$. Alternatively, for example, it is also acceptable to make the length in the circumferential direction $D_C$ and the width in the track width direction $D_{TW}$ equal as with a circle or square.

Furthermore, the first to fourth exemplary embodiments relate to such examples in which the recording element and the effective recording area in a plan view are generally elliptic, generally rectangular, or generally parallelogramic. However, so long as the equations (I) and (III) are satisfied, the recording element and the effective recording area are not limited to a particular shape, and thus may be other than generally elliptic, generally rectangular, or generally parallelogramic.

Additionally, in the first to fourth exemplary embodiments, the pitch of the track 14 in the track width direction $D_{TW}$ is generally constant irrespective of the radial position of the track 14. However, the pitch of the track 14 in the track width direction $D_{TW}$ may vary depending on the radial position of the track 14. In the first exemplary embodiment, the recording element 12A is generally elliptic and generally constant in shape irrespective of the radial position in the magnetic recording medium 16, so that its radial orientation varies depending on the position. Accordingly, if the length $B_L$ of the recording element 12A in the circumferential direction $D_C$ is shorter than the width $B_W$ in the track width direction $D_{TW}$, the width of the track 14 is the maximum at the radial intermediate position or its vicinity in the magnetic recording medium 16. The farther the track 14 is located radially inwardly or outwardly away from this position, the less the width of the track 14 becomes. Accordingly, for example, it is possible to reduce the pitch of the track 14 in the track width direction $D_{TW}$ depending on the amount of reduction in the width of the track 14 as the track 14 is located farther away radially inwardly or outwardly from the radial intermediate position in the magnetic recording medium 16. This makes it possible to increase the radial recording density.

Furthermore, the first to fourth exemplary embodiments relate to such examples in which the filler 32 is made of, for example, an oxide such as $SiO_2$, $Al_2O_3$, $TiO_2$, $ZrO_2$, and ferrite; a nitride such as AlN; a carbide such as SiC; non-magnetic metal such as C (carbon), Si, Ge, Cu and Cr; or a resin material. However, without being limited thereto, the filler 32 can also be made of any material so long as it is a non-magnetic material having a thermal conductivity lower than that of the recording layer 12. Alternatively, the filler 32 may also be made of a magnetic material such as a soft magnetic material.

Additionally, in the first to fourth exemplary embodiments, the magnetic recording medium 16, 40, 50, or 60 has a concave portion between the recording elements 12A formed to the lower surface of the recording layer 12. However, the concave portion can also be formed up to the underlying layers of the recording layer 12 (more specifically, up to the seed layer 28 or part of the soft magnetic layer 26). Alternatively, the concave portion may be formed in the recording layer from the upper surface facing against the substrate to a position between the upper surface and the lower surface, so that the recording layer may be continuous below the concave portion.

Additionally, in the first to fourth exemplary embodiments, the concave portion between the recording elements 12A is filled with the filler 32 to prevent heat transfer from the target recording element 12A to another recording element 12A adjacent thereto while reducing bumps and dips on the surface thereby stabilizing the head flying height. However, the concave portion may be an empty portion when a sufficiently stable head flying height can be ensured without filling the concave portion with the filler 32. This can reduce heat transfer from the target recording element 12A to another recording element 12A adjacent thereto more efficiently.

Additionally, in the first to fourth exemplary embodiments, the heating head 18 is designed to heat the target recording element 12A of the magnetic recording medium 16, 40, 50, or 60 using near-field light. However, so long as the target recording element 12A of the magnetic recording medium 16, 40, 50, or 60 can be heated, the heating head may include, for example, a laser light source and an objective lens located in close proximity to the top surface of the magnetic recording medium 16. Then, the magnetic recording medium 16, 40, 50, or 60 may be irradiated with a laser beam focused thereon through the objective lens, thereby heating the magnetic recording medium 16, 40, 50, or 60. Alternatively, the target recording element 12A of the magnetic recording medium 16 may be irradiated with an electron beam to thereby heat it.

Additionally, in the first to fourth exemplary embodiments, the seed layer 28 and the soft magnetic layer 26 are formed below the recording layer 12. However, the configuration of layers below the recording layer 12 may be altered, as appropriate, depending on the type of the magnetic recording apparatus. For example, below the soft magnetic layer 26, an antiferromagnetic layer and/or an under layer may be formed. Alternatively, each layer may be made up of multiple layers. Furthermore, one or two of the soft magnetic layer 26 and the seed layer 28 may be eliminated. The recording layer 12 may be formed directly on the substrate 24.

Additionally, in the first to fourth exemplary embodiments, the magnetic recording medium 16, 40, 50, or 60 is of a single-side recording type with the recording layer 12 formed on one side of the substrate 24. However, various exemplary embodiments of the present invention are also applicable to a double-side magnetic recording medium with the recording layer formed on both sides of the substrate. In this case, the heating head, the recording head, and the reproducing head may be provided on both sides of the magnetic recording medium.

Furthermore, in the first to fourth exemplary embodiments, the magnetic recording medium 16, 40, 50, or 60 is of a perpendicular recording type. However, various exemplary embodiments of the present invention are also applicable to a magnetic recording medium of a longitudinal recording type. Note that in this case, a soft magnetic layer needs not be formed below the recording layer.

What is claimed is:

1. A magnetic recording apparatus comprising:
a magnetic recording medium in which a recording layer is formed in a concavo-convex pattern so that recording elements for recording magnetic data are formed of convex portions of the concavo-convex pattern and a plurality of the recording elements is arranged in each of tracks in a row in a circumferential direction;
a heating head for heating the recording element; and
a recording head for applying a recording magnetic field to the recording element, wherein
the following equation (I)

$$B_L \leq E_{RL} \leq B_L + 2 \times G_L \quad \text{(Equation (I))}$$

is satisfied in each of the tracks, where $B_L$ represents a length of the recording element in the circumferential direction, $G_L$ represents a length of a gap between the recording elements in the circumferential direction, and $E_{RL}$ represents an effective recording length which is a length of an effective recording area in the circumferential direction, the effective recording area being created on the magnetic recording medium by the heating head and the recording head.

2. The magnetic recording apparatus according to claim 1, wherein the following equation (II)

$$B_L + 2 \times T_{RL} \leq E_{RL} \leq B_L + 2 \times G_L - 2 \times T_{RL} \quad \text{(Equation (II))}$$

is satisfied, where $T_{RL}$ represents a recording deviation in the circumferential direction, the recording deviation in the circumferential direction being an amount of deviation in the circumferential direction upon recording between a target recording element of the recording elements and the effective recording area.

3. The magnetic recording apparatus according to claim 1, wherein:

in each of the tracks, an end of the recording element in a track width direction is generally aligned with an end of the track in the track width direction; and the following equation (III), $$B_W \leq E_{RW} \leq B_W + 2 \times G_W \quad \text{(Equation (III))}$$

is satisfied, where $B_W$ represents a width of the recording element in the track width direction, $G_W$ represents a width of a gap between the tracks in the track width direction, and $E_{RW}$ represents an effective recording width which is a width of the effective recording area in the track width direction.

4. The magnetic recording apparatus according to claim 2, wherein:

in each of the tracks, an end of the recording element in a track width direction is generally aligned with an end of the track in the track width direction; and the following equation (III), $$B_W \leq E_{RW} \leq B_W + 2 \times G_W \quad \text{(Equation (III))}$$

is satisfied, where $B_W$ represents a width of the recording element in the track width direction, $G_W$ represents a width of a gap between the tracks in the track width direction, and $E_{RW}$ represents an effective recording width which is a width of the effective recording area in the track width direction.

5. The magnetic recording apparatus according to claim 3, wherein the following equation (IV), $$B_W + 2 \times T_{RW} \leq E_{RW} \leq B_W + 2 \times G_W - 2 \times T_{RW} \quad \text{(Equation (IV))}$$

is satisfied, where $T_{RW}$ represents a recording deviation in the track width direction, the recording deviation in the track width direction being an amount of deviation in the track width direction upon recording between a target recording element of the recording elements and the effective recording area.

6. The magnetic recording apparatus according to claim 4, wherein the following equation (IV), $$B_W + 2 \times T_{RW} \leq E_{RW} \leq B_W + 2 \times G_W - 2 \times T_{RW} \quad \text{(Equation (IV))}$$

is satisfied, where $T_{RW}$ represents a recording deviation in the track width direction, the recording deviation in the track width direction being an amount of deviation in the track width direction upon recording between a target recording element of the recording elements and the effective recording area.

7. The magnetic recording apparatus according to claim 1, wherein, in a plan view in a thickness direction of the magnetic recording medium, the recording element and the effective recording area are generally similar to each other in shape.

8. The magnetic recording apparatus according to claim 2, wherein, in a plan view in a thickness direction of the magnetic recording medium, the recording element and the effective recording area are generally similar to each other in shape.

9. The magnetic recording apparatus according to claim 3, wherein, in a plan view in a thickness direction of the magnetic recording medium, the recording element and the effective recording area are generally similar to each other in shape.

10. The magnetic recording apparatus according to claim 5, wherein, in a plan view in a thickness direction of the magnetic recording medium, the recording element and the effective recording area are generally similar to each other in shape.

11. A magnetic recording medium incorporated into the magnetic recording apparatus according to claim 1.

12. A magnetic recording medium incorporated into the magnetic recording apparatus according to claim 2.

13. A magnetic recording medium incorporated into the magnetic recording apparatus according to claim 3.

14. A magnetic recording medium incorporated into the magnetic recording apparatus according to claim 5.

15. A magnetic recording medium incorporated into the magnetic recording apparatus according to claim 1.

* * * * *